United States Patent Office 3,404,107
Patented Oct. 1, 1968

3,404,107
RIGID POLYURETHANE FOAMS FROM POLY-ESTERS, POLYETHER POLYOLS AND HYDROXYL-CONTAINING COPOLYMERS
Charles R. Bearden, David H. Swisher, and David C. Garms, Lake Jackson, Tex., assignors to The Dow Chemical Company, Midland, Mich., a corporation of Delaware
No Drawing. Filed Mar. 25, 1965, Ser. No. 442,783
5 Claims. (Cl. 260—2.5)

ABSTRACT OF THE DISCLOSURE

The invention concerns polyurethanes that are the reaction product of an organic polyisocyanate and (1) a copolymer of a hydroxyl alkyl acrylate and a vinyl aromatic compound, (2) an unsaturated polyester that is the reaction product of the half-ester of maleic anhydride and a hydroxyalkyl acrylate reacted with a diglycidyl ether of a bisphenol and interpolymerized with a vinyl aromatic compound, and (3) a polyether polyol that is the condensation product of an alkylene oxide having from 2 to 3 carbon atoms in the molecule with a polyhydric alcohol having from 2 to 8 hydroxyl groups, which polyol has from 8 to 30 percent ethylene oxide moieties and an OH equivalent weight of from 60 to 120.

---

This invention concerns new polyurethane foam products and relates to a method of making the same. It pertains especially to rigid polyurethane foams having high load bearing properties.

It is known to prepare polyurethane foams by reacting a polyether polyol, such as a condensate of propylene oxide and a polyhydric alcohol having three or more hydroxyl groups, or a hydroxyl-containing polyester, with a polyisocyanate in excess of that theoretically required to react with the active hydrogens in the mixture of ingredients, and in admixture with a volatile organic blowing agent. Such foams are useful for a variety of purposes in the home and industry. However, the polyurethane foams often have lower load bearing properties than is desired for many purposes, which restricts greatly the uses for which they are otherwise well suited.

Accordingly, it is a primary object of the invention to provide new polyurethane foams having high load bearing properties. Another object is to provide a method for making rigid polyurethane foams having high load bearing characteristics, and low density. Other and related objects may appear from the following description of the invention.

According to the invention, rigid polyurethane foams having high load bearing characteristics, together with good tensile strength, solvent resistance and other advantages can readily be prepared by reacting (1) from 20 to 35 percent by weight of a copolymer of from 30–50 percent by weight of a hydroxyalkyl acrylate having the general formula

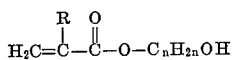

wherein R is a member of the group consisting of hydrogen and the methyl radical and $n$ is a whole number from 2 to 3, and correspondingly from 70–50 percent by weight of a monovinyl aromatic compound having the general formula

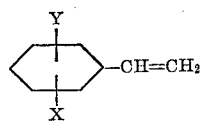

wherein X and Y each represents a member of the group consisting of hydrogen, alkyl radicals having from 1 to 3 carbon atoms and halogen, which copolymer has a molecular weight between about 800 and 1400, (2) from 20 to 50 percent by weight of an unsaturated polyester that is the reaction product of (a) the half-ester of maleic anhydride and a hydroxyalkyl acrylate having the above general formula, and (b) an epoxy resin that is the glycidyl ether of a bisphenol having the general formula

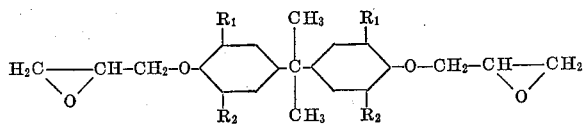

wherein $R_1$ and $R_2$ each represents hydrogen, chlorine or bromine, and which epoxy resin or glycidyl ether has an epoxy equivalent weight of from about 170 to 250, interpolymerized with (c) a monovinyl aromatic compound having the above general formula to form a final rigid thermoset product from 20 to 50 percent by weight of a polyether polyol that is the condensation product of a polyhydric compound having from 2 to 8 OH groups in the molecule and an alkylene oxide having from 2 to 3 carbons with the proviso that not more than 20 percent of the alkylene oxide moieties are ethylene oxide moieties and which polyether polyol has an OH equivalent weight of from 60 to 120, with (3) an approximately chemically equivalent amount, of a polyisocyanate, e.g., from about 0.95 to 1.05, NCO groups for each OH group in the copolymer, the unsaturated polyester, and the polyether polyol, while the ingredients are mixed with, or are in admixture with, a minor amount of a volatile organic liquid blowing agent that is miscible with or is a solvent for the copolymer and the polyester starting materials.

The copolymer starting material can be prepared by polymerizing a mixture of a hydroxyalkyl acrylate having the aforementioned general formula such as 2-hydroxyethyl acrylate, 2-hydroxyethyl methacrylate, hydroxypropyl acrylate, hydroxypropyl methacrylate, or a mixture of any two or more of such hydroxyalkyl acrylates and a vinyl aromatic compound having the aforementioned general formula, e.g. styrene, vinyltoluene, vinylxylene, ethylvinylbenzene, isopropylstyrene, tert.-butylstyrene, chlorostyrene, or dichlorostyrene, in the desired proportions, at temperature between 80° and 110° C., in admixture with a solvent or an organic liquid which may act as a polymerization chain length regulator, or in the presence of carbon tetrachloride or lauroyl mercaptan, to form a copolymer having a molecular weight of from 800 to 1400, and which is soluble in, or mixable with the unsaturated polyester starting material employed. The copolymer can be used in amounts of from about 25 to 60 percent by weight of the sum of the weights of the copolymer and the unsaturated polyester initially used, and said polyester is correspondingly employed in amounts of from 75 to 40 percent by weight of the sum of said ingredients.

The unsaturated polyester starting material is the reaction product of (a) the half-ester of maleic anhydride and a hydroxyalkyl acrylate such as 2-hydroxyethyl acrylate, 2-hydroxyethyl methacrylate, hydroxypropyl acrylate or hydroxypropyl methacrylate, and (b) a stoichiometric amount of an epoxy resin that is the glycidyl ether of a bisphenol or a halogenated bisphenol having the aforementioned general formula and having an epoxy equivalent weight between about 170 and 250, interpolymerized with (c) a monovinyl aromatic compound, e.g. styrene, having the aforementioned formula, to form a final product having a molecular weight corresponding to an absolute viscosity of from 5 to 2000 centipoise at 25° C.

The polyether polyol can be the reaction product of a mixture of ethylene oxide and propylene oxide, or of propylene oxide alone or of propylene oxide followed by ethylene oxide with polyhydric alcohols such as water, ethylene glycol, propylene glycol, glycerine, pentaerythritol, trimethylol propane, pentaglycerol, sorbitol, mannitol, sucrose, 1,2,4-trihydroxybenzene, 1,3,5-trihydroxybenzene or 1,2,3,5-tetrahydroxybenzene, which reaction product has an OH equivalent weight between 60 and 120.

The polyisocyanate can be tolylene diisocyanate (TDI), diphenylmethane-4,4'-diisocyanate (MDI), polymethylene polyphenylisocyanate (PAPI), dianisidine, diisocyanate (DADI), triphenylmethane triisocyanate, or hexamethylene diisocyanate. The polyisocyanate is employed in amount corresponding to about a stoichiometric amount of one NCO group, preferably from about 1 to 1.05 NCO groups for each active OH and/or H group in the mixture of ingredients.

In practice the polyurethane foams are prepared by reacting a mixture of the copolymer, the polyester and the polyether polyol in proportions as hereinbefore stated and in admixture with a volatile organic liquid blowing agent that is miscible with, or a solvent for said ingredients, with the polyisocyanate, and advantageously in admixture with a cell regulating agent and one or more catalysts for the urethane reaction.

Among volatile organic substances that are suitable as solvents for the copolymer and as blowing agents for the foam there may be mentioned as examples, ethyl chloride, methyl chloride, isopropyl chloride, vinylidene chloride, acetone, methyl ethyl ketone, methylene chloride, carbon tetrachloride, chloroform and mixtures of such compounds with fluorine-containing compounds such as trichlorofluoromethane, dichlorodifluoromethane, trifluoromethane, chlorotrifluoromethane, or dichlorotetrafluoroethane.

Suitable cell-control agents are the silicone-glycol surfactants such as the polyoxyalkylene block copolymers having the general formula

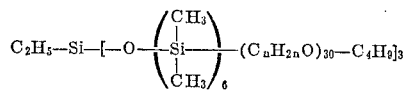

wherein $C_nH_{2n}O$ is a mixed polyoxyethylene-polyoxypropylene block copolymer containing about 17 oxyethylene units and about 13 oxypropylene units, and of the type disclosed in United States Patent No. 2,834,748, and silicone-glycol copolymers of the Dow Corning 202 surfactant type or dimethyl polysiloxane fluids.

Among suitable catalysts for the polyurethane reaction are the amines such as triethylenediamine, N-ethylmorpholine, N-methylmorpholine, N,N,N',N'-tetramethylbutane diamine, and metal salts such as stannous octoate, stannous oleate, dibutyltin dioctoate, and dibutyltin dilaurate.

Polymerization initiators or catalysts are methyl ethyl ketone peroxide, α,α-azobisisobutyronitrile, octyl peroxide α,α-azobisisobutyronitrile, acetyl peroxide, benzoyl peroxide, tert.-butyl peracetate, tert.-butyl-perbenzoate, or dicumyl peroxide. The catalyst is employed in amounts of from 0.2 to 2.5 percent by weight of the polyester starting material.

Driers such as cobalt naphthenate, manganese naphthenate, cobalt linoleate, or manganese linoleate, can advantageously be added to the polyester in amounts of from about 0.25 to 1.75 percent by weight, to accelerate the polymerization reaction.

The following examples illustrate ways in which the principle of the invention has been applied, but are not to be construed as limiting its scope.

EXAMPLE 1

(A) A charge of 98 parts by weight of maleic anhydride was mixed with 116 parts by weight of 2-hydroxy- ethyl acrylate in a reaction vessel equipped with a reflux condenser and stirrer. The mixture was stirred at temperatures between about 90° C. and 110° C. for a period of 90 minutes. The reaction product was the half-ester of maleic anhydride having the formula

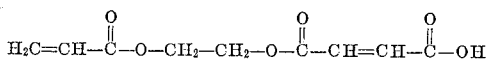

The half-ester is a liquid which gels below its boiling point and has a refractive index of $n_D^{25}$ 1.4839.

(B) A charge of 214 parts by weight of the half-ester of maleic anhydride and 2-hydroxyethyl acrylate, prepared in part A above, was mixed with 170 parts by weight of diglycidyl ether of bisphenol A having the formula

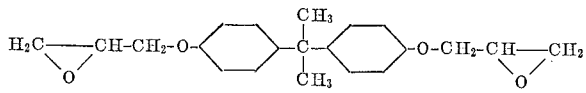

Epoxy Resin D.E.R. 332, having an epoxy equivalent weight of 172 and a viscosity of 4000 centipoises at 25° C.

To the reacted mixture there was added 576 parts by weight of styrene. The resulting mixture was stirred and maintained at tempertaures between 50° and 70° C. for a period of 1-2 hours. The product was an unsaturated polyester having an average molecular weight of 1000, an absolute viscosity of 5 centipoise at 25° C., and 0.9 percent acidity calculated as —COOH.

(C) A copolymer was prepared by mixing 40 parts by weight of 2-hydroxyethyl acrylate and 60 parts by weight of styrene with 100 parts by weight of carbon tetrachloride as solvent and reaction medium in a glass reaction vessel equipped with a reflux condenser and stirrer. One part by weight of benzoyl peroxide was added as catalyst. The resulting mixture was stirred and was heated at refluxing temperatures for a period of 10 hours to polymerize the monomers. Thereafter, a portion of the carbon tetrachloride was distilled from the mixture. The residue was placed in a shallow dish in a vacuum oven and was maintained at a temperature of about 40° C. for 16 hours under 3 millimeters absolute pressure. The copolymer was a friable, brittle solid that was easily crushed to a powder. The copolymer contained 40 percent by weight 2-hydroxyethyl acrylate, by analysis. The copolymer had a viscosity characteristic of 5 centistokes at 100° F. as determined for a 50 weight solution of the copolymer in methyl ethyl ketone.

(D) A polyurethane foam was prepared from a mixture of the copolymer prepared in part A above, the unsaturated polyester prepared in part C above and a polyol consisting of the condensation product of propylene oxide with a mixture of 2.5 moles of glycerine, 1 mole of sucrose and 0.5 mole of water in amount of 1 mole of the propylene oxide for each OH group in the mixture of the ingredients to form a polyol product having an average molecular weight of 540, employing procedure and ingredients as follows:

A charge of 50 parts by weight of the copolymer prepared in part A above was mixed with 100 parts by weight of the unsaturated polyester prepared in part C above and 50 parts of the polyether polyol. The resulting mixture was stirred at room temperature until the copolymer was dissolved. Stirring was continued while adding 0.75 part by weight of triethylenediamine and 1.5 parts by weight of silicone oil DG-20, as catalyst and cell regulating agent, respectively, to the mixture. Thereafter, there was added in sequence with stirring 40 parts by weight of trichlorofluoromethane and 45 parts by weight of tolylene diisocyanate. After adding the tolylene diisocyanate as the final ingredient the mixture was stirred for 60 seconds, then was poured into a cylindrical mold 6 inches in diameter, by 5 inches high and was allowed to react. The mixture foamed to a cellular mass 7 inches high in a period of 150 seconds, then set to a rigid body. The foam was composed of uniform fine closed cells and had a density of 5 lb./ft.³.

EXAMPLE 2

(A) A copolymer of 40 percent by weight of 2-hydroxyethyl acrylate and 60 percent by weight of styrene, having a viscosity characteristic of 5 centistokes at 100° F. as determined for a 50 weight percent solution of the copolymer in methyl ethyl ketone, was prepared employing procedure similar to that employed in part A of Example 1.

(B) A polyurethane foam was prepared from a mixture of the copolymer described in part A of this example, a portion of the unsaturated polyester prepared in part C of Example 1, a polyether polyol as employed in Example 1, employing procedure similar to that employed in part D of Example 1 and ingredients as follows.

| Ingredient: | Parts by weight |
| --- | --- |
| Copolymer | 50 |
| Unsaturated polyester | 100 |
| Polyether polyol 600 | 50 |
| Stannous octoate | 2.5 |
| Silicone oil DG-113 | 2.5 |
| Cobalt naphthenate | 1.0 |
| Methyl ethyl ketone peroxide | 3.0 |
| Tolylene diisocyanate | 45 |
| Trichlorofluoromethane | 45 |

The mixture of ingredients were blended together by vigorous stirring for a period of 60 seconds, then was poured into a paper cup and allowed to foam. The product was a cellular mass of uniform small cells and had a density of 6 lb./ft.³.

EXAMPLE 3

(A) A copolymer of 60 percent by weight styrene and 40 percent by weight hydroxypropyl acrylate, having a viscosity characteristic of 6 centistokes at 100° F. as determined for a 50 weight percent solution of the copolymer in methyl ethyl ketone, was prepared by procedure similar to that employed in part A of Example 1.

(B) A polyurethane foam was prepared from a mixture of the copolymer prepared in part A of this example, a portion of the unsaturated polyester prepared in part C of Example 1, and a polyether polyol as employed in Example 1, employing procedure similar to that employed in part D of Example 1 and ingredients as follows:

| Ingredient: | Parts by weight |
| --- | --- |
| Copolymer | 50 |
| Polyether polyol | 50 |
| Silicone oil (L-520) | 3 |
| Stannous octoate | 2.5 |
| Tolylene diisocyanate | 45 |
| Methylene chloride | 45 |
| Polyester (Ex. 1) | 50 |
| α,α-azobisisobutyronitrile | 0.2 |

The foam product was cellular mass having a density of 2.5 lbs./cu. ft.

We claim:

1. An organic cellular polyurethane product comprising (1) from 20 to 35 weight percent of a copolymer of (a) from 30 to 50 percent by weight of a hydroxyalkyl acrylate monomer having the general formula

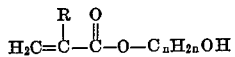

wherein R is a member of the group consisting of hydrogen and the methyl radical and $n$ is a whole number between 2 and 3, and (b) correspondingly from 70 to 50 percent by weight of a vinylidene aromatic monomer having the general formula

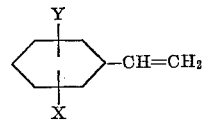

wherein X and Y each represents a member of the group consisting of hydrogen, chloride and alkyl radicals having from 1 to 3 carbons, which copolymer has a molecular weight between 800 and 1400, (2) from 20 to 50 weight percent of an unsaturated polyester starting material that is the reaction product of (a) the half-ester of maleic anhydride and a hydroxyalkyl acrylate monomer having the above formula, reacted with (b) a stoichiometric amount of an epoxy resin that is a diglycidyl ether of a bisphenol and has the general formula

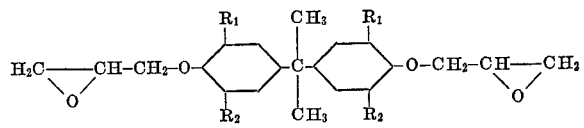

wherein $R_1$ and $R_2$ each represents a member of the group consisting of hydrogen, chlorine and bromine, and which epoxy resin has an epoxy equivalent weight of from 170 to 250, interpolymerized with (c) a vinyl aromatic monomer having the above formula to form a final polyester product having an absolute viscosity of from 5 to 2000 centipoises at 25° C., and (3) from 20 to 50 weight percent of a polyether polyol that is the condensation product of an alkylene oxide having from 2 to 3 carbons and a polyhydric alcohol having from 2 to 8 hydroxyl groups with the proviso that from 8 to 30 percent of the alkylene oxide moieties are ethylene oxide moieties and said polyether polyol has an OH equivalent weight of from 60 to 120, reacted with an approximately stoichiometric amount of a polyisocyanate corresponding to from about one NCO group for each OH group in said mixture of ingredients, while dissolved in and in admixture with a volatile organic substance boiling below 110° C. as blowing agent to produce said cellular polyurethane product.

2. A cellular polyurethane product as claimed in claim 1 wherein the copolymer is a copolymer of 2-hydroxyalkyl acrylate and styrene.

3. A cellular polyurethane product as claimed in claim 1 wherein the polyester is the reaction product of the half-ester of maleic anhydride and 2-hydroxyethyl acrylate reacted with diglycidyl ether of 4,4'-isopropylidene diphenol and interpolymerized with styrene.

4. A cellular polyurethane product as claimed in claim 1 wherein the polyether polyol is the condensate of propylene oxide with a mixture of about 2.5 moles of glycerine 1.0 mole of sucrose and 0.5 mole of water, in amount corresponding to about 4 moles of the propylene oxide.

5. A cellular polyurethane product as claimed in claim 1 wherein the copolymer is a copolymer of hydroxypropyl acrylate and styrene.

References Cited

UNITED STATES PATENTS

| 3,294,711 | 12/1966 | Von Bonin | 260—2.5 |
| 3,304,273 | 2/1967 | Stamburger | 260—75 |
| 3,314,901 | 4/1967 | Daumiller et al. | 260—2.5 |

DONALD E. CZAJA, *Primary Examiner.*

W. E. PARKER, *Assistant Examiner.*